(12) United States Patent
Ramaswamy et al.

(10) Patent No.: US 10,901,644 B2
(45) Date of Patent: Jan. 26, 2021

(54) DATA-AWARE ORCHESTRATION

(71) Applicant: Microsoft Technology Licensing, LLC, Redmond, WA (US)

(72) Inventors: Subramanian Ramaswamy, Redmond, WA (US); Raja Krishnaswamy, Redmond, WA (US); Kumar Gaurav Khanna, Woodinville, WA (US); Gopala Krishna R. Kakivaya, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 190 days.

(21) Appl. No.: 16/154,713

(22) Filed: Oct. 8, 2018

(65) Prior Publication Data

US 2020/0042222 A1 Feb. 6, 2020

Related U.S. Application Data

(60) Provisional application No. 62/712,948, filed on Jul. 31, 2018.

(51) Int. Cl.
*G06F 3/06* (2006.01)
*H04L 29/08* (2006.01)

(52) U.S. Cl.
CPC ............ *G06F 3/0644* (2013.01); *G06F 3/067* (2013.01); *G06F 3/0619* (2013.01); *G06F 3/0629* (2013.01); *H04L 67/1095* (2013.01)

(58) Field of Classification Search
CPC .... G06F 3/0644; G06F 3/0619; G06F 3/0629; G06F 3/067; H04L 67/1095

USPC .......................................................... 707/610
See application file for complete search history.

(56) References Cited

U.S. PATENT DOCUMENTS

| | | | |
|---|---|---|---|
| 9,910,712 B2 | 3/2018 | Antony | |
| 2014/0181051 A1* | 6/2014 | Montulli | G06F 11/1464 707/679 |
| 2014/0181813 A1* | 6/2014 | Deshpande | G06F 16/113 718/1 |
| 2014/0196056 A1* | 7/2014 | Kottomtharayil | G06F 9/45533 718/105 |
| 2014/0201737 A1* | 7/2014 | Mitkar | G06F 9/5077 718/1 |

(Continued)

OTHER PUBLICATIONS

"International Search Report and Written Opinion Issued in PCT Application No. PCT/US19/038068", dated Sep. 10, 2019, 14 Pages.

*Primary Examiner* — Evan Aspinwall
(74) *Attorney, Agent, or Firm* — Ray Quinney & Nebeker; James Bullough

(57) ABSTRACT

Data-aware orchestration with respect to a distributed system platform enables at least lifting and shifting of pre-existing applications and associated data without developer action. A volume of a local store is created automatically in response to a container comprising a user application that is non-native with respect to the distributed system platform. The volume is then exposed to the container for use by the application to save and retrieve data. The container and local store are co-located on a compute node providing at least high availability. The application and local store can be duplicated on one or more replicas providing reliability in case of a failure. Further, partitions can be created automatically in response to declarative specification.

20 Claims, 11 Drawing Sheets

(56) References Cited

U.S. PATENT DOCUMENTS

| | | | |
|---|---|---|---|
| 2016/0004721 A1* | 1/2016 | Iyer | G06F 16/184 707/649 |
| 2016/0077926 A1* | 3/2016 | Mutalik | G06F 11/1453 711/162 |
| 2016/0283281 A1* | 9/2016 | Antony | G06F 3/0617 |
| 2016/0359955 A1* | 12/2016 | Gill | H04L 67/10 |
| 2016/0371153 A1* | 12/2016 | Dornemann | G06F 11/1464 |
| 2016/0373291 A1* | 12/2016 | Dornemann | H04L 41/0856 |

\* cited by examiner

DATA-AWARE ORCHESTRATION

CROSS-REFERENCE TO RELATED APPLICATIONS

This application claims the benefit of U.S. Provisional Application No. 62/712,948 filed Jul. 31, 2018, the entirety of which is incorporated herein by reference.

BACKGROUND

To exploit benefits of cloud computing, it can be desirable to retarget applications, designed for execution in on-premise data centers, to the cloud. One option is to re-architect an application for the cloud environment. A less expensive option is to move the pre-existing application to the cloud for execution. However, there are several obstacles associated with moving the application. For example, the application is not guaranteed to run on the same machine or node. In fact, movement is common to address unexpected failures and reboots. This is troubling for stateful applications that expect a disk to be available to read and write. In one instance, a portion of node storage can be made available to a container in which a stateful application executes. However, if the container restarts or moves nodes, data is lost. To avoid data loss, an external store is typically utilized in place of local storage to separate the application from its data.

SUMMARY

The following presents a simplified summary to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to data-aware orchestration that facilitates lifting and shifting of existing applications and associated data into a distributed or cloud platform without developer action. An application can be encapsulated in a container that provides for non-native execution with respect to a distributed system platform. A driver can be employed to create and expose a volume to a container for saving application state data. The volume can be co-located with the application on a compute node. Further, the volume can be partitioned as well as replicated automatically on one or more compute nodes.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the disclosed subject matter. Other advantages and novel features may become apparent from the following detailed description when considered in conjunction with the drawings.

DETAILED DESCRIPTION

Figure 1:
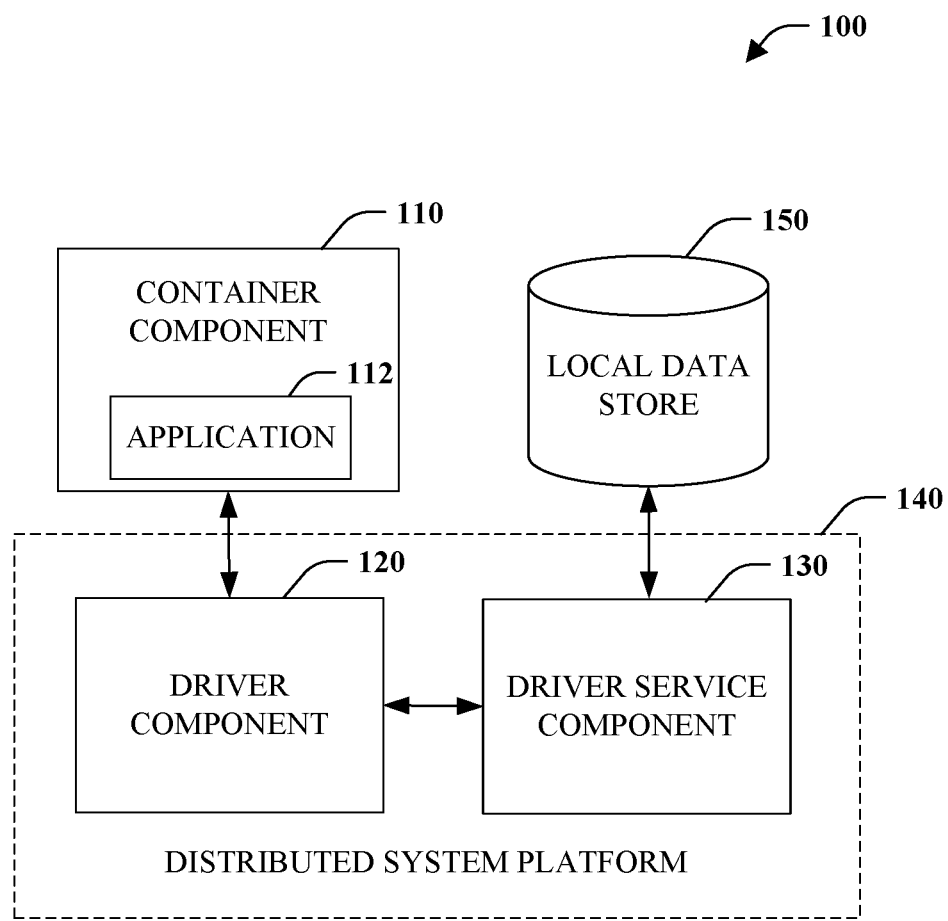
FIG. 1 is a schematic block diagram of a data-aware orchestration system.

Stateful applications, which access and write data to a local disk, have traditionally been designed for, and run in, on-premise data centers. For instance, application processing logic can read from and write to a database. To exploit benefits of cloud computing, it may be desirable to execute an on-premise application in a cloud or distributed environment. In one instance, an application can be re-coded natively for a distributed system, which is expensive in terms of time and resources. Further, distributed systems involve unexpected failures caused by power failure and reboots for updates, among other things. Stateful applications thus need to ensure data is not lost in failure cases, which is typically accomplished through use of a remote data store. Remote data stores, however, have several disadvantages. First, there is a latency cost associated with remote access that negatively affects processing time. Second, if the same service runs on multiple virtual machines or multiple services run on different machines that are all utilizing the same storage, there is a data consistency problem. Additionally, if a cache is used to expedite processing, some writes might not have been pushed to the remote data store before failure and thus some transaction data may be lost. Another disadvantage of such a cache is that if a container moves nodes, the cache will need to be built up again and until then some latency will be present.

The subject description pertains to data-aware orchestration in conjunction with a distributed system platform that permits lifting and shifting of pre-existing applications and associated data without developer action. A distributed system platform, or framework, comprises a set of services to facilitate deploying and managing cloud applications, wherein cloud applications are applications that rely on remote servers for processing logic and data storage that is network accessible by way of the internet and a web browser, for example. In accordance with one implementation, code associated with an existing on-premise application can be packaged in a container and provided to the distributed system platform for execution as a cloud application. A volume driver enables projection of a storage volume into the application space such that the packaged code can interact with a local store. Furthermore, a driver service can trigger replication of local data on one or more other storage nodes. In this manner, data access is fast in comparison to latency associated with a network hop to acquire data from a remote network-accessible store. Further, data replicas enable data to be persistent and safe in the event of a crash or other failure. In other words, an existing database application and store can be lifted from an on-premise system and shifted to execute in a cloud environment such that the application and store are highly available and reliable without further developer action. In addition to replication, simple declarative partitioning is enabled in which a workload can be distributed across a number of available machines.

Various aspects of the subject disclosure are now described in more detail with reference to the annexed drawings, wherein like numerals generally refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Referring initially to FIG. 1, an instance of a data-aware orchestration system 100 is illustrated. The system 100 includes container component 110, which comprises or encapsulates application 112. The application can correspond, in one instance, to a pre-existing stateful application such as a database system executable in an on-premise data center. The pre-existing stateful application can be packaged into the container component 110 as part of a lift operation and made available to the system 100 as part of a shift operation for execution in a distributed or cloud environment. Upon receipt and activation, the container component 110 can employ driver component 120 to provide a volume or volume disk for use by the container component 110 when executing the application 112. More specifically, the container component 110 can request storage from the driver component 120. The driver component 120 can contact the driver service component 130, which identifies a volume of data in the local data store 150 and returns the volume to the container component 110 by way of driver component 120. The container component 110 is thus provided with a path corresponding to a volume of storage accessible by way of the driver component 120. In other words, a volume or disk is projected into the container component 110 for persisting state associated with the application 112.

The driver component 120 and the driver service component 130 can form part of distributed system platform 140 and services provided thereby. The distributed system platform 140 provides a means for deploying and managing distributed or cloud-native applications across a cluster of compute nodes. The local data store 150 can correspond to a non-volatile computer-readable storage medium on a compute node such as a computer or virtual machine.

Figure 2:
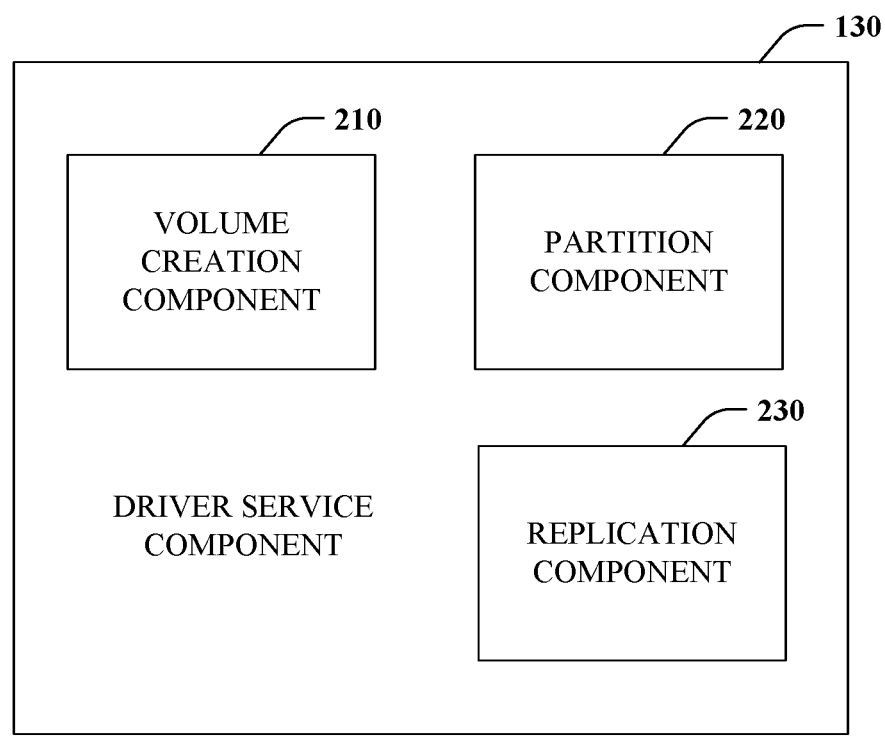
FIG. 2 is a schematic block diagram of a driver service component.

Turning attention to FIG. 2, the driver service component 130 is depicted in further detail. As shown, the driver service component 130 can comprise several subcomponents including volume creation component 210, partition component 220, and replication component 230. The volume creation component 210 can create a volume of storage for use by a container. The volume creation component 210 can employ a local data store on a machine as well as a distributed system platform data service. For instance, a distributed system platform data store can be added to a local data store. The distributed system platform data store can be managed by the distributed system platform while being saved locally. From this system platform data store, a volume of storage can be designated for use by an application. With limited developer input of a declaratory nature, a created volume can also be partitioned and replicated automatically.

In some instances, storage needs might be so large that more than one machine is needed. The partition component 220 can trigger or enable multiple partitions to be established across multiple cluster nodes for storage of application code and state data. Moreover, the partition component 220 can perform such actions in response to declarative specification by a developer or the like as to how many partitions are desired or needed. By way of example, one can indicate that an application, or service, is to have two gigabytes of disk and ten instances of the service. In response, the partition component 220 can partition data automatically such that there are ten instances of a service running in parallel each pointing to their own sliver of two gigabytes of a volume disk.

The replication component 230 can generate replicas of data stores on different nodes of a cluster to support failover and provide high availability, wherein high availability refers to an ability of an application, service, or resource to remain constantly accessible even when confronted with disruptions. In response to declarative specification as to the number of replicas desired, the replication component 240 can enable or trigger generation of such replicas as well as automatic update of the replicas as changes occur. Stated differently, local data co-located with a corresponding application can be copied, or shadowed, to one or more data replicas. As a result, if a failure occurs, data loss is prevented by reacquiring data from a replica.

Figure 3:
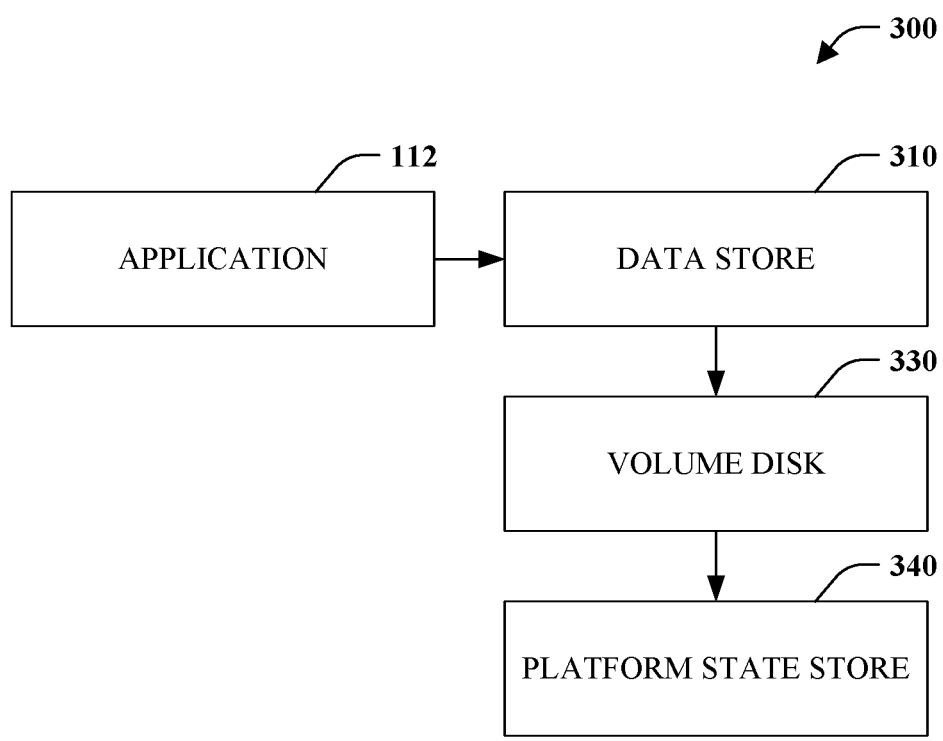
FIG. 3 is a schematic diagram of a data storage structure.

Referring briefly to FIG. 3, a data storage structure 300 is illustrated in accordance with an aspect of this disclosure. As shown, an application 112 exists that requires a data store 310 for state persistence. For example, the application can correspond to a database system that allows users to read and write data to a database, among other things. The data store 310 of the application 112 can be stored to a volume disk 330, or simply a volume, which is a portion of platform state store 340 that resides on a local storage medium and is managed by a distributed system platform. Stated differently, the platform state store 340 provides a volume disk that is projected into a container for use by a stateful application.

While the data storage structure 300 shows support for a stateful data store associated with an application, it should be appreciated that the stateless application, or instance thereof, can also be saved to the volume disk to enable partitioning and replication of the application and its state. Further, if the application crashes, the local copy of the application can allow for fast recovery. Additionally, data-aware orchestration seeks to ensure co-location of an application and data and consistent movement thereof. To that end, if an application fails movement can be to a location where the data already exists and if the data fails movement can be to a location where the application already exists. Replication and failover to an already present replica is expeditious and solves problems associated can with traditional use of remote stores, wherein transaction data can be lost due employment of a cache whose data is not pushed to the remote store prior to failure and subsequent latency associated with re-building a cache.

Figure 4:
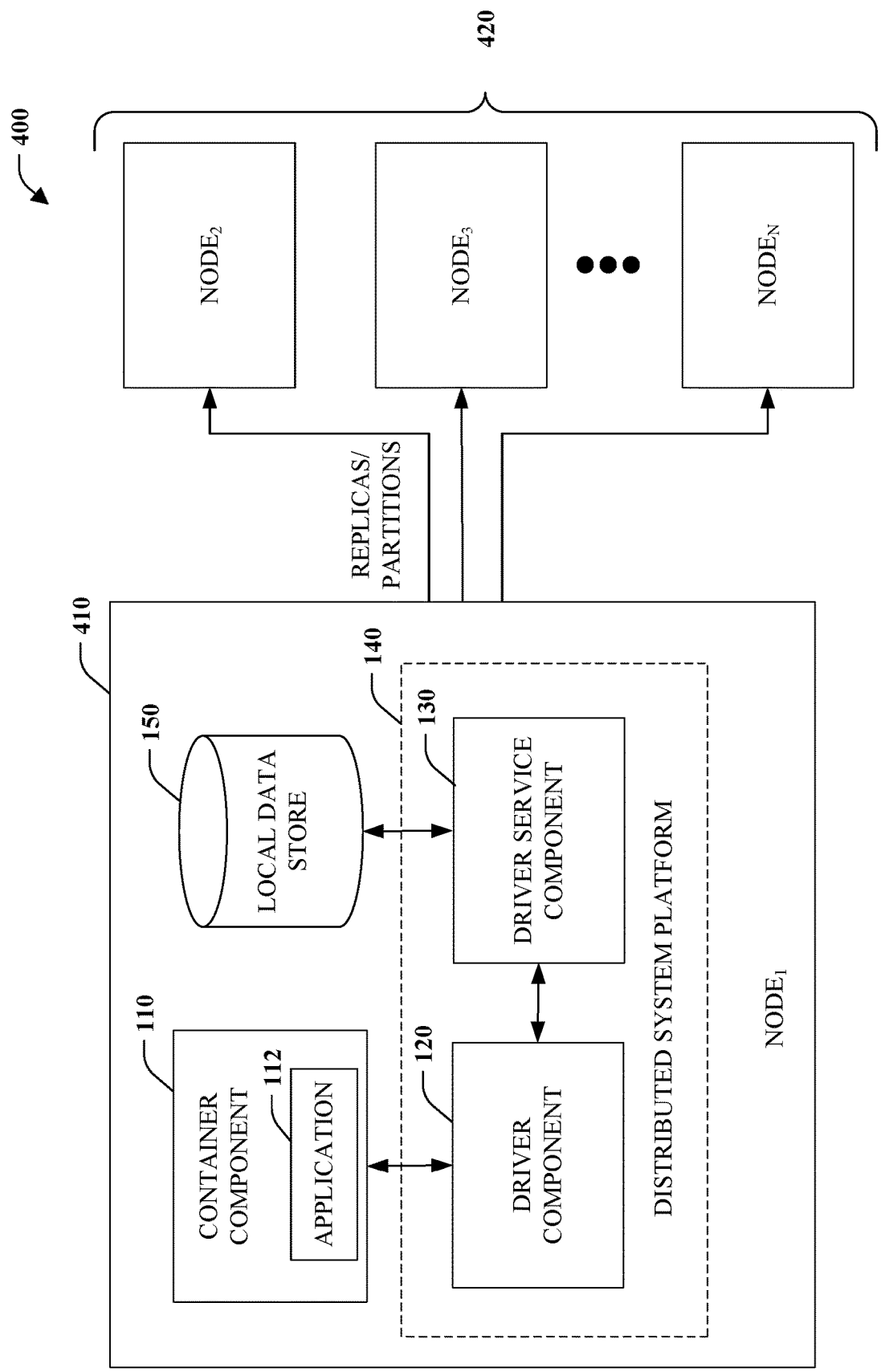
FIG. 4 is a schematic block diagram of a computer cluster.

FIG. 4 is a block diagram depicting a computer cluster 400. The computer cluster 400 comprises a plurality of nodes, which can correspond to computers or virtual machines executing on physical computers. The system 100 is illustrated in a first node 410, which could be a primary node. Further, a plurality of additional nodes 420 ($NODE_2$-$NODE_N$, wherein N is an integer greater than two) to which the application 112 and associated state data can be partitioned and/or replicated are depicted. Furthermore, functionality associated with the distributed system platform, such as the driver service component 130, can provide a mechanism for initial generation of partitions and replicas as well as updates to replicas to reflect state changes automatically without developer action. The application 112 and associated state are co-located in first node 410. Consequently, data is highly available and does not suffer from latency, among other issues, associated with use of external stores. Nevertheless, use of external stores is not excluded. In fact, in one embodiment, application data can be partitioned in a manner in which application data that is more frequently accessed (e.g., hot data) is stored locally while data that is accessed less frequently (e.g., cold data) is stored externally in another node. Further, replicas provide reliability and robustness in view of failures. For example, assume $NODE_1$ is the primary node and a failure occurs with respect to power or commodity hardware issues. A replica on $NODE_2$, which comprises the application and state, can be made the new primary node as part of a failover process, and application processing continues without loss of data.

Figure 5:
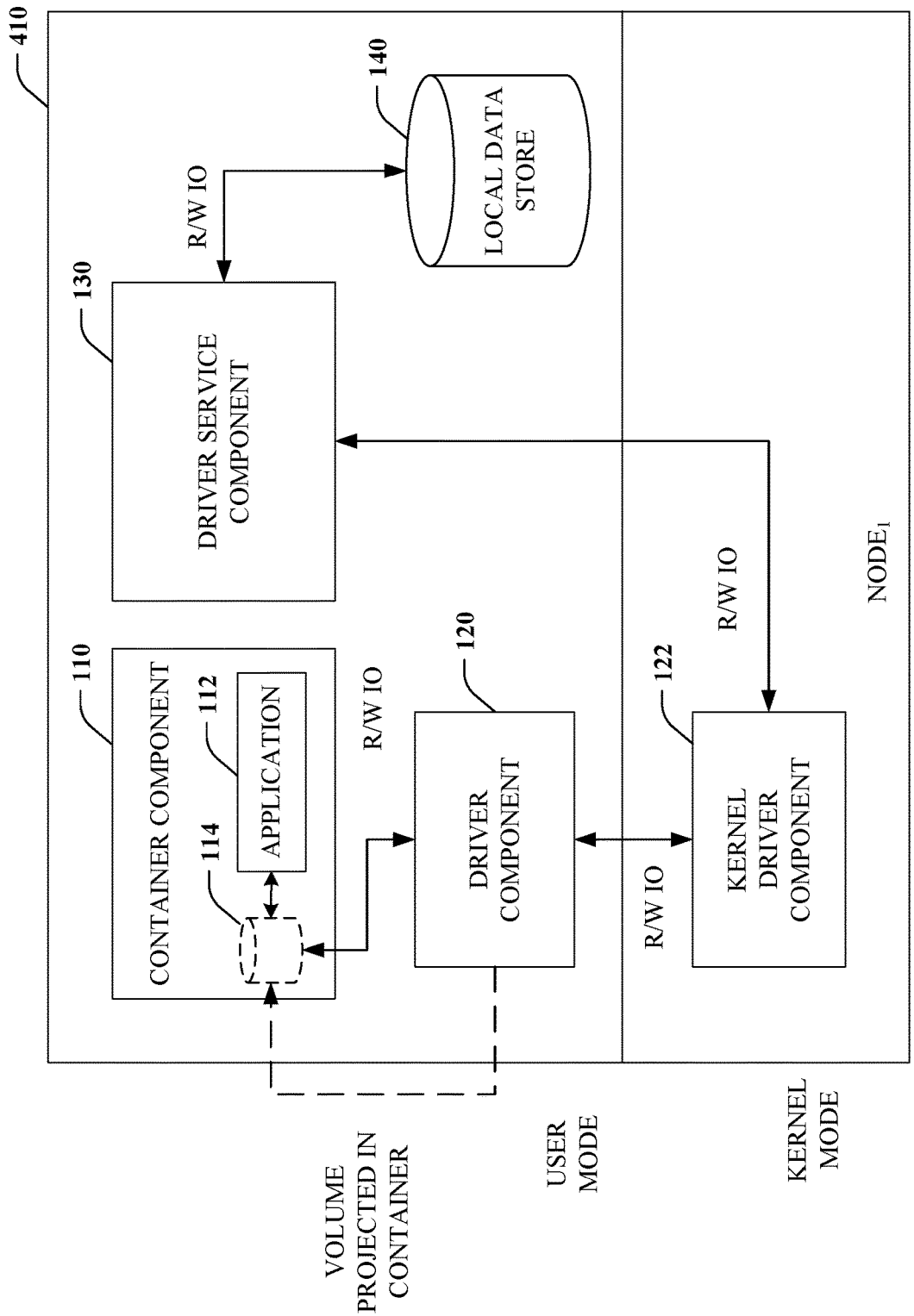
FIG. 5 is a schematic block diagram of data-aware orchestration within a compute node of a cluster.

Turning attention to FIG. 5, a particular implementation of the data-aware orchestration system 100 is depicted in a compute node. As shown, container component 110 is running on the first node 410, which can be a virtual machine (VM). The container component 110 can be provided by a customer of a distributed system platform, which includes the user application 112. A volume is created in response to a request from the container component 110 that propagates to the driver service component 130. Here, the diagram also illustrates user and kernel modes. Kernel mode executes processes with extremely high privileges. User mode does not have as many privileges as kernel mode, and it can also be slower because it has to go through the kernel. For example, disk operations might be trapped by a user mode process in the operating system, which is communicating with a kernel mode process to write bytes to a hard disk. Volume 114 is projected into the container component 110 by the driver component 120 and corresponds to a service volume that is mounted locally in node 410. The service volume disk can be interacted with using kernel driver component 122. For replication purposes, whenever the container component 110 is running on the same VM, another service or agent is running side by side called the volume driver service of the driver service component 130. The driver service component 130 performs heavy lifting by interacting with the kernel to make sure a container process can interact with the service volume disk while also replicating and updating state data across multiple nodes.

In operation, the application 112 can issue a read or write request to the volume 114 projected in the container component 110. The read or write request is next provided to the driver component 120, which subsequently passes the request to the kernel driver component 122. The kernel driver component 122 then sends the request to the driver service component 130, which ultimately processes the request with respect to the local data store 150 to read or write data in accordance with the request. In response to processing of the request, the same path can be traversed backward to return read data or a write confirmation.

In accordance with one or more embodiments, data can be classified into two or more classes, such as hot and cold. Hot data denotes data that is frequently accessed, and cold data identifies data that is infrequently accessed. Data can be deemed hot or cold data based on observed and/or predicted usage. Further, one or more thresholds can be specified to define when data usage is frequent versus infrequent. Furthermore, data may change classes over time. Hot data can be saved locally co-located on the same compute node with computations that operate over the data for fast processing. Cold data can be saved to a remote compute node. Further, hot and cold classes of data can inform a decision regarding hardware. For instance, hot data can be stored on premium disks, non-volatile random-access memory (NVRAM), or other technologies for speed, while cold data can be placed on spinning disk drives. Moreover, hardware placement decisions can be utilized even if all data is stored on a single node or substrate. One or more components of the distributed system platform 140 can perform classification and data placement, including, but not limited to, the driver component 120 and the driver service component 130.

The aforementioned systems, architectures, platforms, environments, and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. For example, the driver component 122 and driver service component 130 may be combined into a single component. Communication between systems, components and/or sub-components can be accomplished in accordance with either a push and/or pull model. The components may also interact with one or more other components not specifically described herein for the sake of brevity, but known by those of skill in the art. By way of example, and not limitation, each compute node can include inter and intra communication services to enable at least node set up and replication.

Furthermore, various portions of the disclosed systems above and methods below can include or employ artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example, and not limitation, such mechanisms can be utilized in conjunction with partitioning data to predict which data will be utilized frequently and ensure that such data is stored locally as opposed to remotely. Further, predictions regarding potential failures can be utilized to trigger generation of one or more additional replicas. Further yet, such mechanism can be utilized to classify data (e.g., hot, warm, cold) based on predicted usage frequency.

In view of the exemplary systems described above, methods that may be implemented in accordance with the disclosed subject matter will be better appreciated with reference to flow chart diagrams of FIGS. 6-9. While for purposes of simplicity of explanation, the methods are shown and described as a series of blocks, it is to be understood and appreciated that the disclosed subject matter is not limited by the order of the blocks, as some blocks may occur in different orders and/or concurrently with other blocks from what is depicted and described herein. Moreover, not all illustrated blocks may be required to implement the methods described hereinafter. Further, each block or combination of blocks can be implemented by computer program instructions that can be provided to a processor to produce a machine, such that the instructions executing on the processor create a means for implementing functions specified by a flow chart block.

Figure 6:
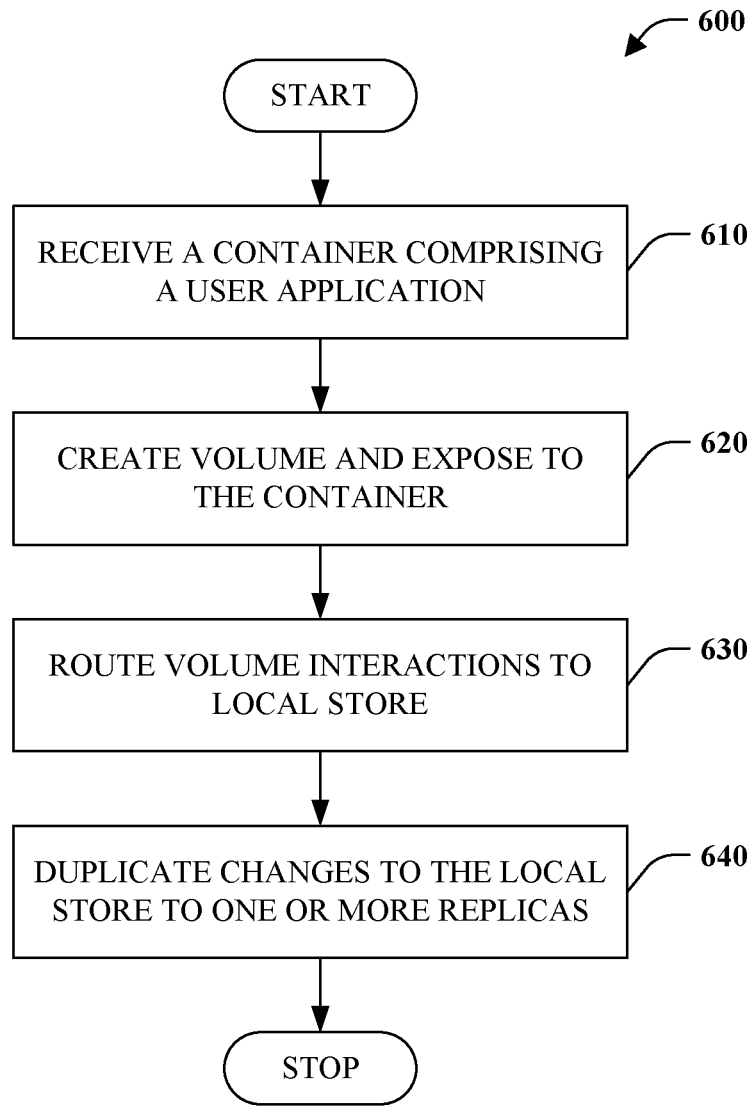
FIG. 6 is a flow chart diagram of a method of data-aware orchestration.

FIG. 6 illustrates a flow chart diagram of a method 600 of data-aware orchestration. At reference numeral 610, a container comprising a pre-existing user application is received, retrieved, or otherwise obtained or acquired. In one instance, the pre-existing application can be lifted from an on-premise datacenter and shifted to a distributed or cloud environment. At numeral 620, a storage volume is created and exposed to the container. For example, a path can be provided to access the volume through the container by way of a volume driver. The volume is co-located on a machine with the container and an encapsulated application. Further, the volume can be created from a distributed system platform store, wherein the store and management thereof are provided as a service, for instance as part of a platform-as-a-service architecture. Consequently, a pre-existing user application non-native to a distributed system platform can be employed with the distributed system platform. At reference numeral 630, volume interactions can be routed to a local stored thereby providing high availability and fast data access in contrast to latency associated with remote data stores. At reference numeral 640, changes to the local store and more particularly the exposed volume are duplicated to one or more replicas. As a result, data loss can be presented or at least mitigated in case of failure of a compute node.

Figure 7:
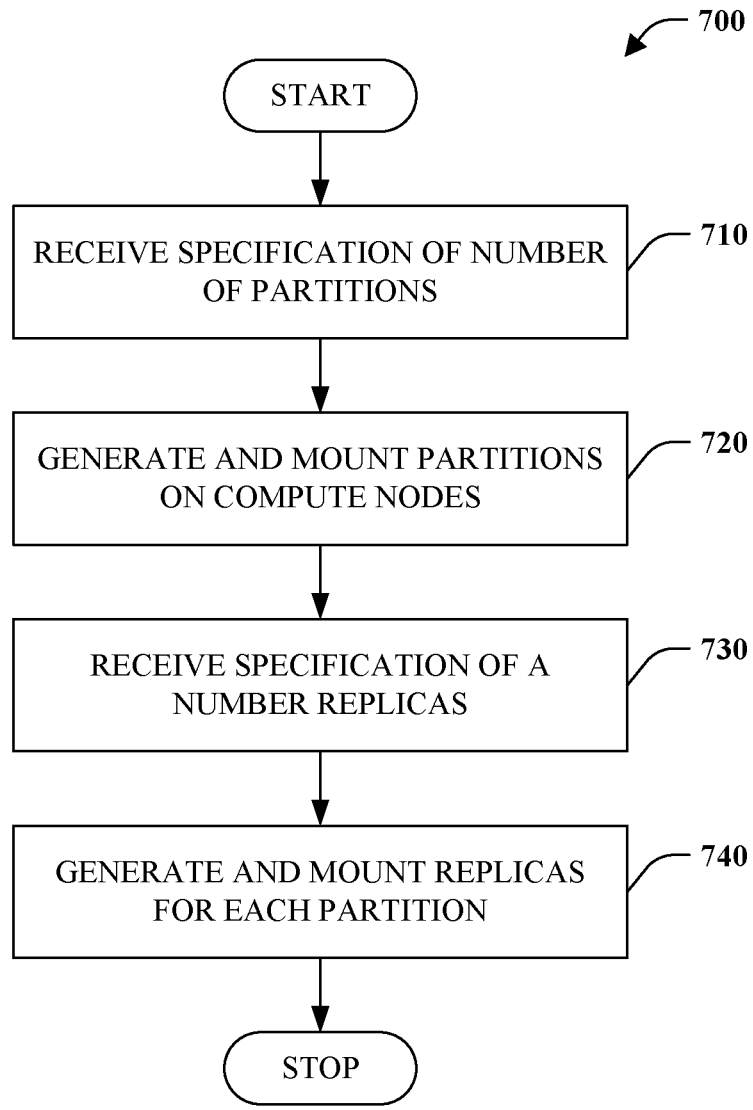
FIG. 7 is a flow chart diagram of a method of data-aware orchestration with respect to partitioning and replication.

FIG. 7 illustrates a flow chart diagram of a method 700 of data-aware orchestration with respect to partitioning and replication. At reference numeral 710, declarative specification of a number of partitions desired is received. At numeral 720, the specified number of partitions are generated and mounted on compute nodes. For instance, an application including a large storage requirement can be partitioned to execute across multiple compute nodes in a cluster. Consider, for example, a situation in which ten gigabytes of storage is required and each compute node has two gigabytes of storage. In this case, five partitions of two gigabytes each can be specified and subsequently created automatically. At numeral 730, declarative specification of a number of replicas can be received. In response, at reference numeral 740, the specified number of replicas are generated and mounted to compute nodes. For instance, four replicas can be specified such that each of the five partitions associated with the example above have four replicas created automatically for a total of twenty replicas.

Figure 8:
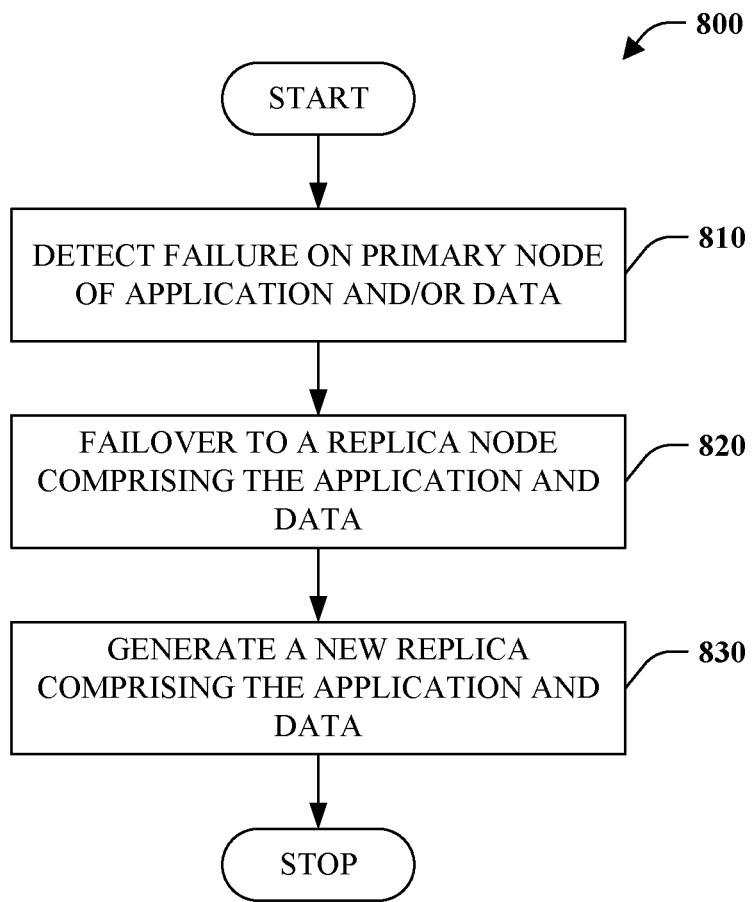
FIG. 8 is a flow chart diagram of a failover method.

FIG. 8 is a flow chart diagram of a failover method 800. At reference numeral 810, failure of a primary node of an application and/or data is detected. A failure can occur for a variety of reasons including power or component failure. Failover can be performed in response to failure on of a primary node, wherein failover refers to automatically switching to a secondary system for processing after failure of a primary system such that the secondary system becomes the new primary system. At reference numeral 820, failover is to a replica node comprising a replica of the application and data on the primary node. The replica node is now designated as the primary node. In this manner, the application and data remain co-located on a node even in the event of a failure. At reference numeral 830 a new replica is generated comprising the application and data to replace the replica that became the new primary node.

Figure 9:
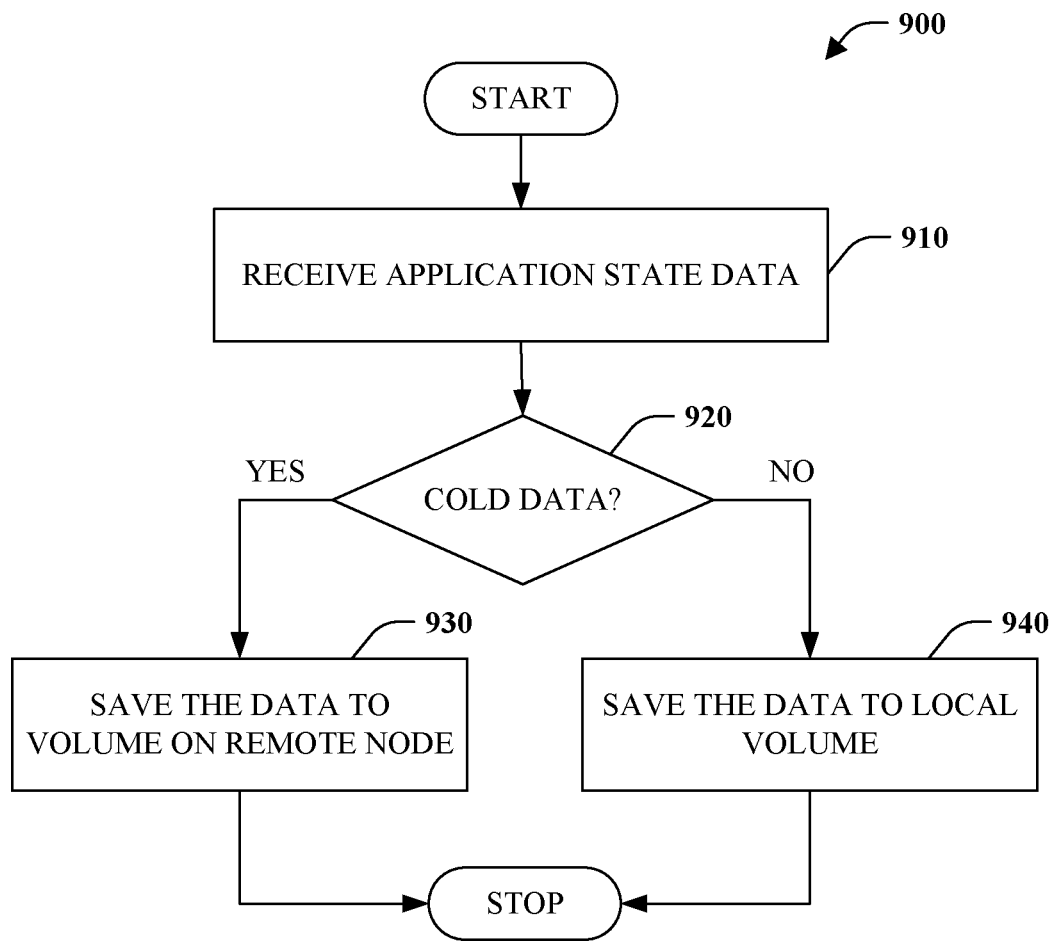
FIG. 9 is a flow chart diagram of a storage method.

FIG. 9 is a flow chart diagram of a storage method 900. At reference numeral 910, application state data is received, retrieved, or otherwise obtained or acquired. Although not limited thereto, the state data can correspond to database data in accordance with one embodiment. At reference numeral 920, a determination is made as to whether the data is cold data, or, in other words, data that is infrequently accessed. A comparison between actual or predicted access frequency with a predetermined access threshold can be utilized to determine that the data corresponds to cold data. If at numeral 920 it is determined that the data is cold data, the method proceeds to numeral 930. At reference numeral 930, the data is saved to a volume on a remote node. If at numeral 930 it is determined that the data is not cold data, the method continues to numeral 940. Data that is not cold may be considered hot, meaning the data is accessed frequently as opposed to infrequently. At numeral 940, the data is saved to a local volume. The method 900 consequently allows infrequently accessed data to be stored to and accessed from a remote node, while frequently accessed data is stored to and accessed from a local node improving storage.

Figure 10:
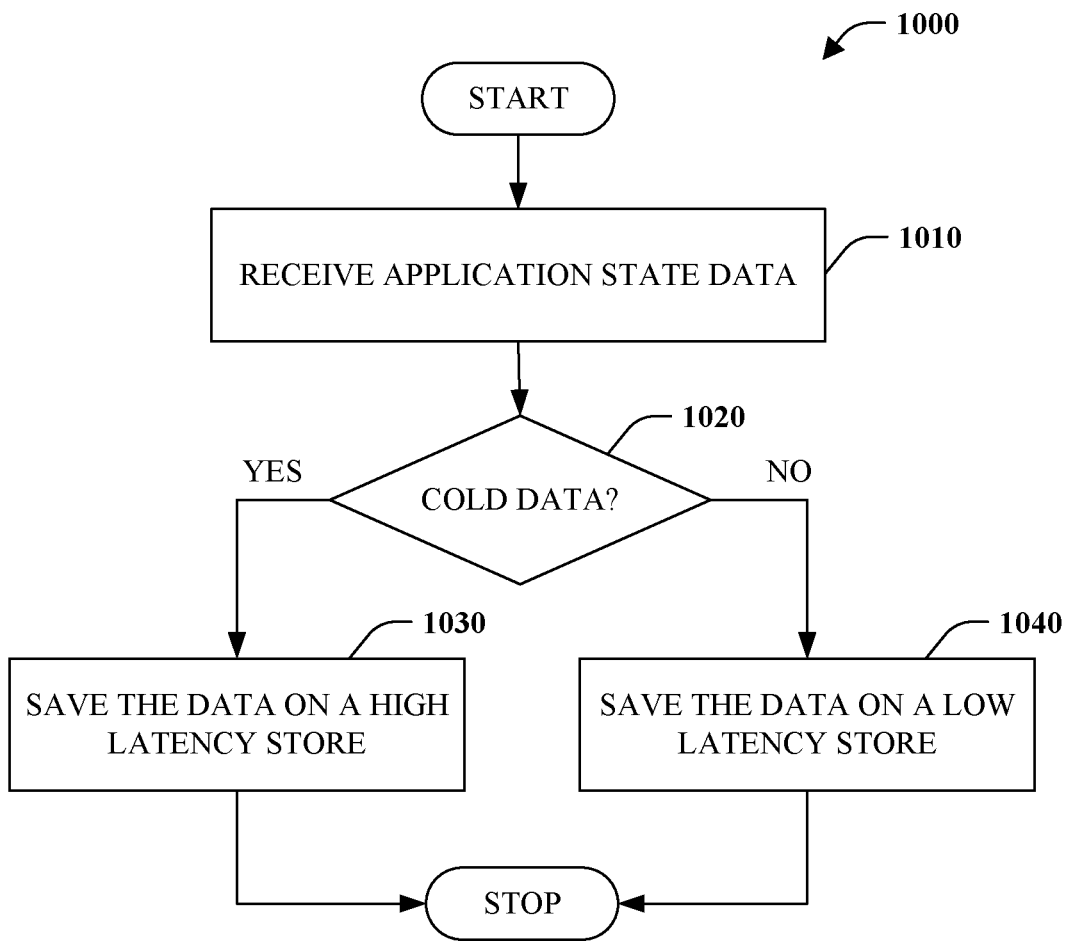
FIG. 10 is a flow chart diagram of a storage method.

FIG. 10 is a flow chart diagram of a storage method 1000. At reference numeral 1010, application state data is received, retrieved, or otherwise obtained or acquired. In one instance, the state data can correspond to database data. A determination is made, at reference numeral 1020, as to whether the data is cold data, or, in other words, data that is infrequently accessed. A comparison between actual or predicted access frequency with a predetermined access threshold can be utilized to determine that the data corresponds to cold data. If the data is classified as cold data at numeral 1020 ("YES"), the method continues to numeral 1030. At reference numeral 1030, the cold data is saved to a high-latency store such as a spinning disk. Alternatively, if the data is not classified as cold at numeral 1020, the method proceeds to numeral 1040. At reference numeral 1040, the non-cold data, or hot data, is saved to a low-latency store such as non-volatile random-access memory (NVRAM) or other premium disks. Additionally, or alternatively, other low-latency technologies can be involved such as remote direct memory access (RDMA), which allows direct memory access from the memory of one computer into the memory of another computer without involving an operating system from either computer.

In accordance with some embodiments, the application and state data can correspond to a database system and local stored procedures that execute over the database. Further, traditional on-premise workloads use a database that is setup separately to make the data highly available. With aspects disclosed herein the database can be moved in a container to the cloud and made highly available through replication.

Aspects of the subject disclosure pertain to the technical problem of lifting and shifting an application from a first execution environment to a second execution environment different from the first execution environment. For example, an application encoded for execution in an on-premise data center can be lifted and shifted to a distributed or cloud environment. Technical mechanisms are utilized to orchestrate non-native execution of an application in conjunction with a distributed system platform. The application can be encapsulated for execution in a container and a driver can be employed to expose a volume to the application for state storage. Further, the driver can create a volume from a distributed-system platform store on a compute node, and partitioning and replication can be performed automatically based on declarative specification of a number of partitions and/or replicas. Furthermore, the application and data are co-located on a compute node and data-aware orchestration is performed to ensure such collocation even after a failure.

Portions of this disclosure focus on lift and shift migration in which an application or operation is lifted from an on-premise environment and shifted to a cloud environment without requiring re-architecting for the cloud environment. However, this is not meant to be limiting. Other embodiments can shift applications from one data center to another. Further, aspects of the disclosure are applicable to newly architected applications or operations as opposed to preexisting applications or operations.

The subject disclosure various products and processes that perform, or are configured to perform, various actions regarding data-aware orchestration. What follows are one or more exemplary systems and methods.

A system comprises: a processor coupled to a memory that includes machine-executable instructions that when executed by the processor perform the following acts in conjunction with a distributed system platform: creating a volume on a local store of a compute node, responsive to a container comprising a user application, wherein the user application is non-native with respect to the distributed system platform; exposing the volume to the container from which application data can be saved and retrieved by the application in the container, wherein the local store and the container are co-located on the compute node; and automatically replicating the application and the application data on a predetermined number of additional compute nodes in a distributed cluster. The system further comprises switching to a replica on a different compute node comprising the application and the application data after a failure. Further, the system comprises automatically partitioning the application and the application data across multiple compute nodes based on a predetermined number of partitions, and automatically replicating application partitions on the predetermined number of additional compute nodes in the distributed cluster. In one instance, the local store forms part of a state store of the distributed system platform on the compute node. Further, the replication service of the distributed system platform automatically replicates the data in the state store across the predetermined number of compute nodes. Also, the volume is partitioned, wherein the local store comprises frequently accessed data and less frequently accessed data is stored on a remote compute node. In another instance, the application is a preexisting on-premise application. In still another instance, the the compute node is one of a plurality of virtual machines that exist on a physical machine.

A method comprises: executing, on a processor, instructions that cause a distributed system platform to perform the following actions: identifying a container comprising a user application, wherein the user application is non-native with respect to the distributed system platform; creating a volume on a local store, wherein the local store and container are co-located on a compute node; exposing the volume to the container from which application data can be saved and retrieved by the application of the container; and automatically replicating the user application and the application data from the local store to a one or more different compute nodes. The method further comprises updating the one or more different compute nodes with application data changes. Further, the method comprises switching processing to one of the one or more different compute nodes comprising replicas of the application and the application data after a failure on the compute node. The method also comprises recovering from crash, in which the application terminates or stops functioning properly, with local data accessible by way of the exposed volume. The method further comprises automatically partitioning the application and the application data across multiple compute nodes in accordance with a predetermined number of partitions, and routing an external transaction to a corresponding compute node of the multiple compute nodes based on data utilized by the transaction. Furthermore, the method comprises partitioning the application data such that frequently utilized data is stored in the local store and infrequently utilized data is stored in a remote compute node.

A system comprises: a processor coupled to a memory that includes computer executable instructions that when executed on the processor provides a distributed system platform, comprising: a volume driver that initiates creation of a volume on a local store and exposes the volume to a container from which data can be saved and retrieved by a user application encapsulated in the container, wherein the container and local store are co-located on a compute node and the user application is non-native to the distributed system platform; and a replicator that automatically replicates the application and saved data in the local store on a predetermined number of additional compute nodes in a distributed system cluster. In one instance, the distributed system platform further comprises a partition component that automatically partitions the application and saved data across multiple compute nodes in accordance with a predetermined number of partitions. Further, the distributes system platform automatically switches primary processing to one of the additional compute nodes comprising replicas of the application and the application data after a failure on the compute node. Furthermore, the local store is built on a state store of the distributed system platform on the compute node.

As used herein, the terms "component" and "system," as well as various forms thereof (e.g., components, systems, sub-systems ... ) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The conjunction "or" as used in this description and appended claims is intended to mean an inclusive "or" rather than an exclusive "or," unless otherwise specified or clear from context. In other words, "'X' or 'Y'" is intended to mean any inclusive permutations of "X" and "Y." For example, if "'A' employs 'X,'" "'A employs 'Y,'" or "'A' employs both 'X' and 'Y,'" then "'A' employs 'X' or 'Y'" is satisfied under any of the foregoing instances.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 11:
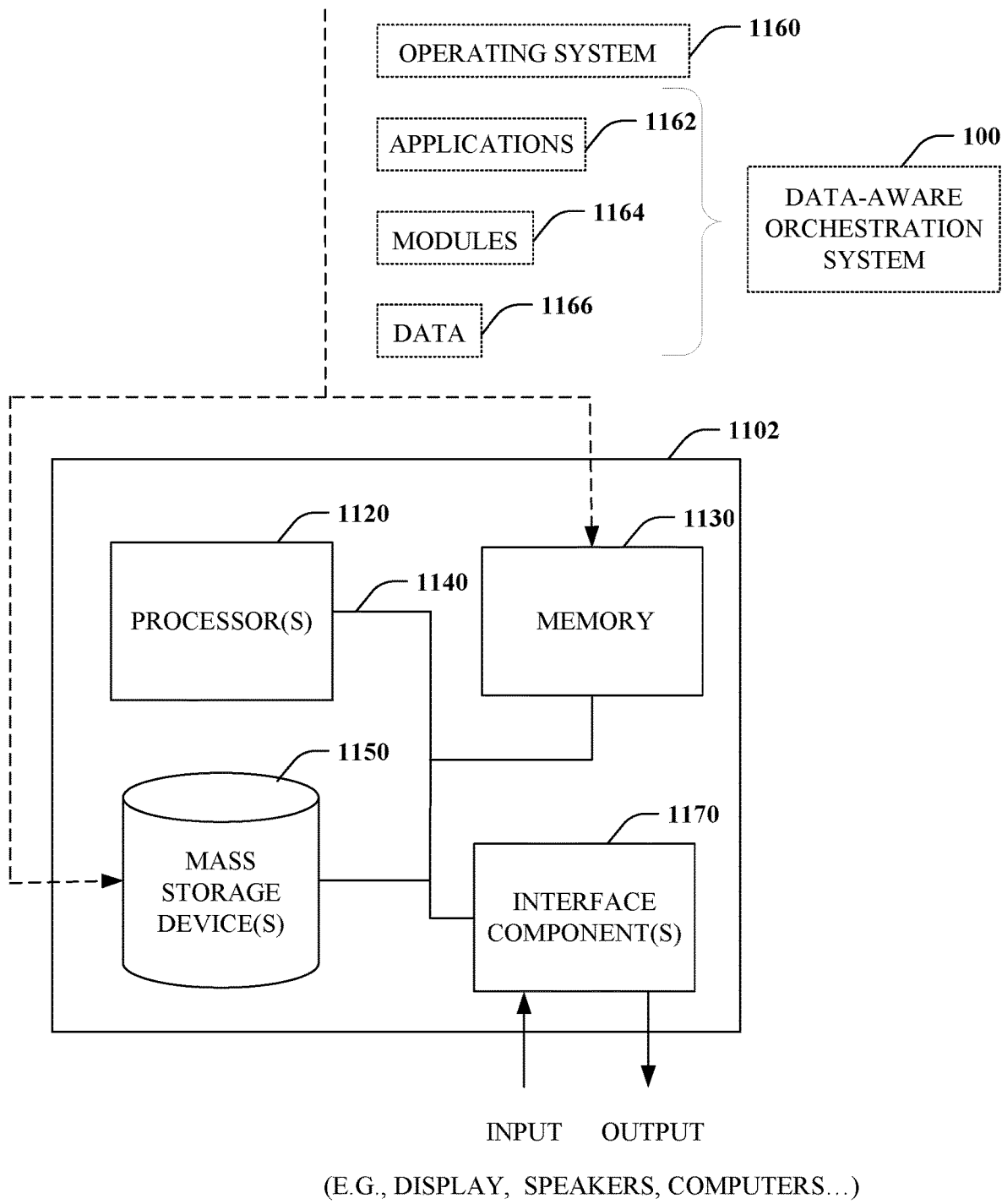
FIG. 11 is a schematic block diagram illustrating a suitable operating environment for aspects of the subject disclosure.

To provide a context for the disclosed subject matter, FIG. 11 as well as the following discussion are intended to provide a brief, general description of a suitable environment in which various aspects of the disclosed subject matter can be implemented. The suitable environment, however, is only an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, mainframe computers, as well as personal computers, hand-held computing devices (e.g., personal digital assistant (PDA), smart phone, tablet, watch . . . ), microprocessor-based or programmable consumer or industrial electronics, and the like. Aspects can also be practiced in distributed computing environments where tasks are performed by remote processing devices that are linked through a communications network. However, some, if not all aspects, of the disclosed subject matter can be practiced on stand-alone computers. In a distributed computing environment, program modules may be located in one or both of local and remote memory devices.

With reference to FIG. 11, illustrated is an example general-purpose computer or computing device 1102 (e.g., desktop, laptop, tablet, watch, server, hand-held, programmable consumer or industrial electronics, set-top box, game system, compute node . . . ). The computer 1102 includes one or more processor(s) 1120, memory 1130, system bus 1140, mass storage device(s) 1150, and one or more interface components 1170. The system bus 1140 communicatively couples at least the above system constituents. However, it is to be appreciated that in its simplest form the computer 1102 can include one or more processors 1120 coupled to memory 1130 that execute various computer executable actions, instructions, and or components stored in memory 1130.

The processor(s) 1120 can be implemented with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 1120 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 1120 can be a graphics processor.

The computer 1102 can include or otherwise interact with a variety of computer-readable media to facilitate control of the computer 1102 to implement one or more aspects of the disclosed subject matter. The computer-readable media can be any available media that can be accessed by the computer 1102 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other like mediums that store, as opposed to transmit or communicate, the desired information accessible by the computer 1102. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 1130 and mass storage device(s) 1150 are examples of computer-readable storage media. Depending on the exact configuration and type of computing device, memory 1130 may be volatile (e.g., RAM), non-volatile (e.g., ROM, flash memory . . . ) or some combination of the two. By way of example, the basic input/output system (BIOS), including basic routines to transfer information between elements within the computer 1102, such as during start-up, can be stored in nonvolatile memory, while volatile memory can act as external cache memory to facilitate processing by the processor(s) 1120, among other things.

Mass storage device(s) 1150 includes removable/non-removable, volatile/non-volatile computer storage media for storage of large amounts of data relative to the memory 1130. For example, mass storage device(s) 1150 includes, but is not limited to, one or more devices such as a magnetic or optical disk drive, floppy disk drive, flash memory, solid-state drive, or memory stick.

Memory 1130 and mass storage device(s) 1150 can include, or have stored therein, operating system 1160, one or more applications 1162, one or more program modules 1164, and data 1166. The operating system 1160 acts to control and allocate resources of the computer 1102. Applications 1162 include one or both of system and application software and can exploit management of resources by the operating system 1160 through program modules 1164 and data 1166 stored in memory 1130 and/or mass storage device(s) 1150 to perform one or more actions. Accordingly, applications 1162 can turn a general-purpose computer 1102 into a specialized machine in accordance with the logic provided thereby.

All or portions of the disclosed subject matter can be implemented using standard programming and/or engineering techniques to produce software, firmware, hardware, or any combination thereof to control a computer to realize the disclosed functionality. By way of example and not limitation, the data-aware orchestration system 100 or portions thereof, can be, or form part, of an application 1162, and include one or more modules 1164 and data 1166 stored in memory and/or mass storage device(s) 1150 whose functionality can be realized when executed by one or more processor(s) 1120.

In accordance with one particular embodiment, the processor(s) 1120 can correspond to a system on a chip (SOC) or like architecture including, or in other words integrating, both hardware and software on a single integrated circuit substrate. Here, the processor(s) 1120 can include one or more processors as well as memory at least similar to processor(s) 1120 and memory 1130, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the data-aware orchestration system 100 and/or functionality associated therewith can be embedded within hardware in a SOC architecture.

The computer 1102 also includes one or more interface components 1170 that are communicatively coupled to the system bus 1140 and facilitate interaction with the computer 1102. By way of example, the interface component 1170 can be a port (e.g. serial, parallel, PCMCIA, USB, FireWire . . . ) or an interface card (e.g., sound, video . . . ) or the like. In one example implementation, the interface component 1170 can be embodied as a user input/output interface to enable a user to enter commands and information into the computer 1102, for instance by way of one or more gestures or voice input, through one or more input devices (e.g., pointing device such as a mouse, trackball, stylus, touch pad, keyboard, microphone, joystick, game pad, satellite dish, scanner, camera, other computer . . . ). In another example implementation, the interface component 1170 can be embodied as an output peripheral interface to supply output to displays (e.g., LCD, LED, plasma, organic light-emitting diode display (OLED) . . . ), speakers, printers, and/or other computers, among other things. Still further yet, the interface component 1170 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A system, comprising:
  a processor coupled to a memory that includes machine-executable instructions that when executed by the processor perform the following acts in conjunction with a distributed system platform:
  creating, by a driver service on a primary compute node, a volume from a service volume mounted locally on a local store of the primary compute node responsive to a request from a container comprising a user application, wherein the user application is non-native with respect to the distributed system platform;
  exposing, by the driver service, the volume to the container from which application data can be saved and retrieved by the user application in the container, wherein the local store and the container are co-located on the primary compute node;
  interacting, by the driver service, with a kernel driver on the primary compute node to verify a connection between the container and the local store; and
  replicating, by the driver service and based on the container being enabled to interact with the local store via the kernel driver, state data for the user application across a predetermined number of additional compute nodes in a distributed cluster.

2. The system of claim 1, further comprising switching processing to a replica on a different compute node comprising the user application and the application data after a failure.

3. The system of claim 1, further comprising automatically partitioning the user application and the application data across multiple compute nodes based on a predetermined number of partitions.

4. The system of claim 3, further comprising replicating application partitions on the predetermined number of additional compute nodes in the distributed cluster.

5. The system of claim 1, wherein the local store forms part of a state store of the distributed system platform on the primary compute node.

6. The system of claim 5, further including instructions that cause a replication service of the distributed system platform to replicate the application data in the state store across the predetermined number of compute nodes.

7. The system of claim 6, wherein the volume is partitioned, and wherein the local store comprises frequently accessed data and less frequently accessed data stored on a remote compute node.

8. The system of claim 1, wherein the user application is a preexisting on-premise application.

9. The system of claim 1, wherein the primary compute node is one of a plurality of virtual machines that exist on a physical machine.

10. A method, comprising:
  identifying, by a driver service on a primary compute node, a container comprising a user application, wherein the user application is non-native with respect to the distributed system platform;
  creating, by the driver service, a volume from a service volume mounted locally on a local store of the primary compute node, wherein the local store and container are co-located on a primary compute node;
  exposing, by the driver service, the volume to the container from which application data can be saved and retrieved by the user application of the container;
  interacting, by the driver service, with a kernel driver on the primary compute node to verify a connection between the container and the local store; and
  replicating, by the driver service and based on the container being enabled to interact with the local store via the kernel driver, state data for the user application across one or more different compute nodes.

11. The method of claim 10, further comprising updating the one or more different compute nodes with application data changes.

12. The method of claim 10, further comprising switching processing to one of the one or more different compute nodes comprising replicas of the user application and the application data after a failure on the primary compute node.

13. The method of claim 10, further comprising recovering from a crash, in which the user application terminates or stops functioning properly, with local data accessible by way of the exposed volume.

14. The method of claim 10, further comprising automatically partitioning the user application and the application data across multiple compute nodes in accordance with a predetermined number of partitions.

15. The method of claim 14, further comprising routing an external transaction to a corresponding compute node of the multiple compute nodes based on data utilized by the transaction.

16. The method of claim 10, further comprising partitioning the application data such that frequently utilized data is stored in the local store and infrequently utilized data is stored in a remote compute node.

17. A system, comprising:
a processor coupled to a memory that includes computer executable instructions that when executed on the processor provides a distributed system platform, comprising:
a volume driver on a primary compute node that initiates creation of a volume on a local store of the primary compute node, exposes the volume to a container from which data can be saved and retrieved by a user application encapsulated in the container, and interacting with a kernel driver on the primary compute node to verify a connection between the container and the local store, wherein the container and local store are co-located on the primary compute node and the user application is non-native to the distributed system platform; and
a replicator that replicates the user application and saved data in the local store across a predetermined number of additional compute nodes in a distributed system cluster and based on the container being enabled to interact with the local store via the kernel driver.

18. The system of claim 17, the distributed system platform further comprising a partition component that automatically partitions the user application and saved data across multiple compute nodes in accordance with a predetermined number of partitions.

19. The system of claim 17, the distributed system platform automatically switches primary processing to one of the additional compute nodes comprising replicas of the user application and the application data after a failure on the primary compute node.

20. The system of claim 17, the local store is built on a state store of the distributed system platform on the primary compute node.

* * * * *